Jan. 21, 1969   CHENG SHIH ET AL   3,423,610
CLOSED SYSTEM FOR MAGNETOPLASMADYNAMIC
ELECTRICAL POWER GENERATION
Filed Sept. 1, 1965
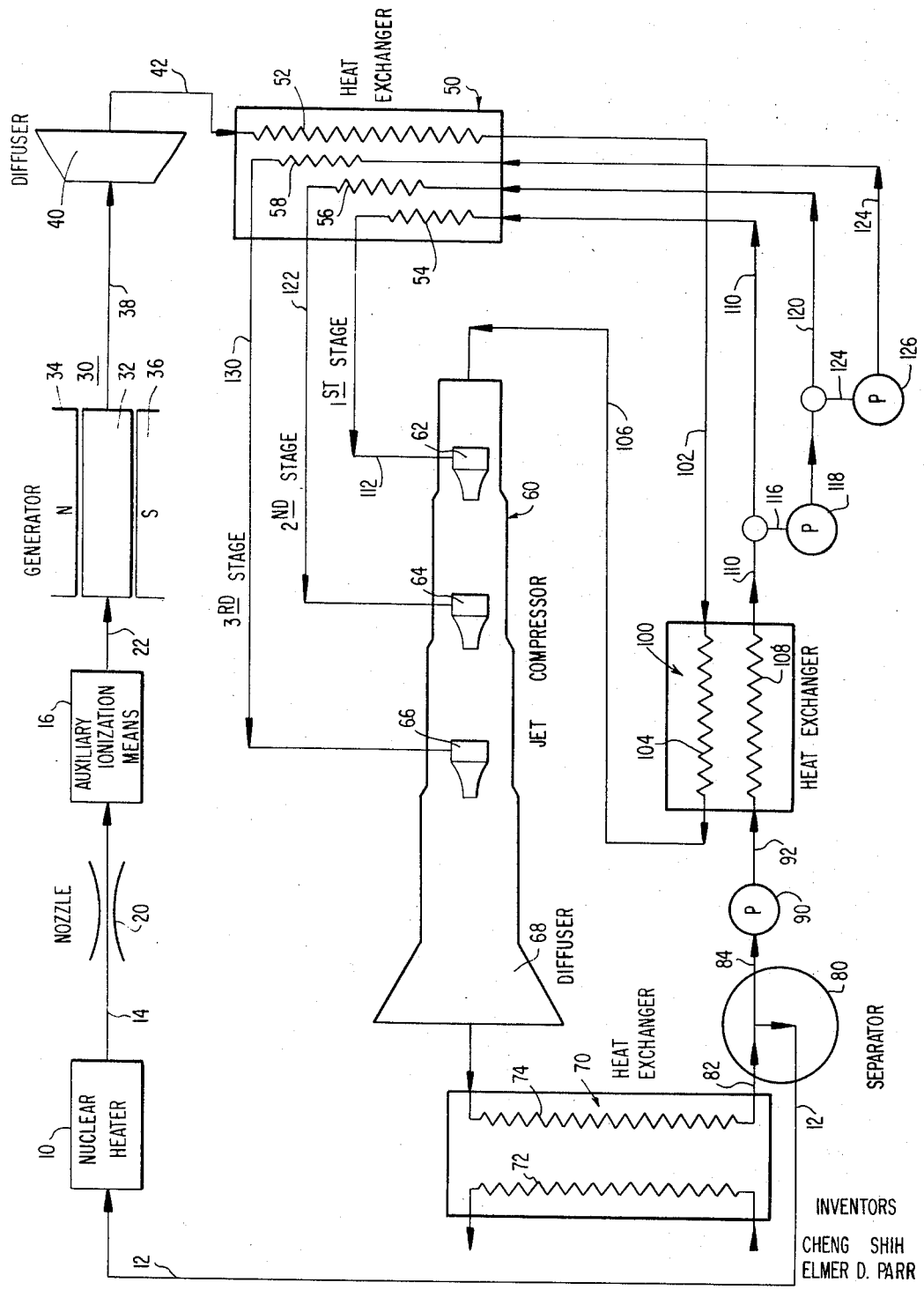
INVENTORS
CHENG SHIH
ELMER D. PARR
R. RHOADS STEPHENSON
MOSTAFA E. TALAAT
BY Sughrue, Rothwell, Mion, Zinn & Macpeak
ATTORNEYS

United States Patent Office 3,423,610
Patented Jan. 21, 1969

3,423,610
CLOSED SYSTEM FOR MAGNETOPLASMADY-
NAMIC ELECTRICAL POWER GENERATION
Cheng Shih, Baltimore, Md., Elmer D. Parr, Dublin,
and R. Rhoads Stephenson, La Canada, Calif., and
Mostafa E. Talaat, Bethesda, Md.; said Shih, Parr and
Stephenson assignors to Martin-Marietta Corporation,
New York, N.Y., a corporation of Maryland
Filed Sept. 1, 1965, Ser. No. 488,833
(Filed under Rule 47(a) and 35 U.S.C. 116)
U.S. Cl. 310—11                                  8 Claims
Int. Cl. G21d 7/02

This invention relates to a magnetoplasmadynamic power generation system and more particularly to a "closed" system characterized in a preferred form by a complete lack of moving parts with increased system efficiency and reliability.

MPD (magnetoplasmadynamic) electrical power generation systems have recently come into vogue, whereby electricity is generated by passing an ionized gas through a magnetic field and extracting electrical energy by electrodes or other pick-up means disposed adjacent the flowing gas and extending transversely to the magnetic field and the direction of movement of the gas. In such devices, the ionization of the gas and the high velocity flow of the gas may be produced or enhanced by raising the temperature of the gas to a relatively high temperature. Additional ionization may also be provided to the gas flow to effect increased conversion efficiency. In such devices, the gases constituting the working fluid must be ionized to an electrical conducting state in order to be useful in generating power and developing output current. Most gases are not good conductors unless at temperatures in the order of 4000° F. and up. The addition of atoms of low ionization potential, such as potassium, sodium, cesium and others aid in attaining a better degree of ionization. As a result, after the ionized gas passes through the electrical generator portion of the system, the gas which has retained considerable thermal energy is generally discharged as waste, greatly reducing the efficiency of the system or in some cases, alternatively, the high temperature gas may be passed through a heat exchanger prior to discharge as a waste medium. In either case, considerable energy is lost.

It has been proposed to use a completely closed system in which the gas is continuously recirculated. In such cases, due to the pressure reduction of the gas flow, it is necessary to use mechanical compressors or the like to recompress the carrier gas prior to passing the gas through the heating means, such as a nuclear reactor or the heat source and thence through the generator per se. As mentioned previously, since the ionized gas is operating at extremely high temperatures, conventional mechanical compressors having moving parts cannot generally be used in such a system due to the high temperature of the gases. However, if mechanical compressors are used, the exhaust gases leaving the electrical generator portion of the system must be cooled by suitable heat exchangers prior to contacting the mechanical compressors. In either case, energy loss is excessive and over-all system efficiency is reduced to the point where the MPD power generation systems are impractical.

In systems of this type, it is normal to use a rather expensive working medium as the carrier gas, which may in itself be ionizable, or in addition, seeding material may be employed to produce the desired amount of ionization within the MPD working medium.

It is, therefore, a primary object of the present invention to provide an improved magnetoplasmadynamic power generation system employing a high temperature, high velocity ionized working medium which has both high reliability and maximum efficiency.

It is a further object of this invention to provide an improved magnetoplasmadynamic power generation system of the "closed" system type in which an expensive working medium may be used and to which seeding material may be economically added.

It is a further object of this invention to provide an improved closed magnetoplasmadynamic power generation system which, in a preferred form, completely eliminates the need for moving mechanical parts within the system and in which the MPD working medium may be circulated at a relatively high temperature and pressurized at this relatively high temperature without damage to the compressor means.

Further objects of this invention will be pointed out in the following detailed description and claims and illustrated in the accompanying drawing, which discloses, by way of example, the principle of this invention and the best mode which has been contemplated of applying that principle.

In the drawing, the single figure is a schematic view of the improved, closed magnetoplasmadynamic electrical power generation system of the present invention employing a jet compressor for compressing the MPD medium.

Magnetoplasmadynamic or magnetohydrodynamic electrical power generation systems operate on the principle of transformation of thermal and kinetic energy into electrical energy by passing a high velocity, high temperature, ionized fluid through a cross-magnetic field. The present invention has application to all conventional MPD electrical power generation systems and more particularly to closed systems of this type in which the working fluid is continuously circulated. The system shown in the drawing is representative of such a closed MPD electrical power generation system. Reference to the drawing shows a nuclear energy source, such as a nuclear reactor 10 as a high temperature heat source for the working fluid which passes through the reactor from input line 12. Nuclear reactor power heat sources are conventional in such systems, the purpose of which is to effect at least some ionization at the high temperature as the highly pressurized fluid passes from inlet conduit 12 through the reactor 10. The high temperature working fluid is discharged from the reactor into a convergent-divergent nozzle 20 by means of reactor discharge line 14. As a result, the working medium is thus delivered as a high velocity, high temperature stream to the electrical generator portion of the system indicated at 30 through nozzle and generator connecting means 22. The generator is shown schematically as a working fluid passage 32 interposed between a pair of spaced magnetic poles 34 and 36.

While the present invention is not directed toward any particular type of working medium, a noble gas, such as helium, may be used as the working medium or high velocity, high temperature gas stream. It may be desirable to add cesium vapor in the order of up to 3 mole percent to the working medium for better gas ionization. Seeding of the working medium in this manner is quite conventional in MPD systems. With the working medium and its seeding heated to a high temperature in the order of 2000° K. and above in the nuclear reactor 10 where it becomes partially ionized, it is passed through the nozzle 20 to attain the designed velocity and is directed through the generator 30 where a portion of the thermal and kinetic energy is converted into electrical energy because of the cross-magnetic field existing there. Auxiliary means of ionization indicated at 16 may be used to enhance the conductivity and consequently the power density of the generator. Such auxiliary means are well known and may include arc discharge or the like across the high velocity, high temperature gas stream emanating from nozzle 20 through line 22 towards the generator 30. In such systems, it is conventional to use opposed pairs of electrodes (not shown) within the cross-magnetic field with the opposite pairs of electrodes providing both the auxiliary ionization and the power take-off means. As mentioned previously, the present invention is not directed to the specific type of magnetoplasmadynamic electrical power generator and the portions of the system just referred to are conventional to most systems.

The present invention is directed to the provision of a completely closed system of this type in which the working medium is continuously circulated and in which the working medium is pressurized in a preferred system characterized by an absence of mechanical moving parts. The working medium including the seeding passes at high velocity and high temperature from the generator 30 to the diffuser 40 by means of conduit 38. The exhaust from the generator passing through conduit 38 is still at a relatively high temperature in the particular system shown, for example, in the order of 1700° to 1800° K. Since the exhaust working medium must be repressurized and delivered to the reactor to complete the recirculation closed system, it is directed from the diffuser at somewhat reduced velocity to a first heat exchanger 50 by means of line 42. The working fluid passes through a heat exchanger coil 52 where some of its heat is given up to a second fluid passing through respective first stage, second stage and third stage heat exchange coils 54, 56 and 58, positioned in heat exchange relationship to the working medium heat exchange coils 52. After losing considerable thermal energy, the working medium passes from the first heat exchanger 50 to a second heat exchanger 100 via conduit 102. The second heat exchanger 100 includes a working medium heat exchange coil 104 therein which further results in heat being given up by the working fluid. This fluid leaves the second heat exchanger 100 and passes to jet compressor 60 by means of line 106 where it is acted upon as a secondary stream of the jet compressor.

The present invention is directed primarily to the use of a jet compressor characterized by complete lack of moving parts for use in a closed loop MPD electrical power generation system where the exhaust from the MPD generator is generally at fairly high temperatures and thus, unacceptable by conventional compressors having moving parts. The sensible heat of the exhaust is thus used in both the first heat exchanger 50 and the second heat exchanger 100 to vaporize and superheat another high pressure fluid, for example, liquid cesium which then forms the primary system of the jet compressor. The exhaust, after passing through the heat exchanger forms the secondary stream of the jet compressor 60. The high pressure primary stream is injected into the jet compressor through expansion nozzles to change its pressure into velocity (kinetic) energy. The high velocity primary stream, therefore, entrains with it the secondary stream to a mixing chamber where a momentum transfer takes place. A pressure rise follows when the mixture is slowed down through a diffusion process. The mixture is then separated by condensation, the condensate is pumped to a much higher pressure back to the vaporizer or heat exchanger and the working medium or seeded gas is recirculated through the heater and generator to form the useful work desired. The need for efficient usage of the exhaust heat due to the fact that jet compressors are normally inefficient devices is achieved by the use of the first and second heat exchangers and thus, while jet compressors are normally inefficient, they are, in this case, advantageously used due to the fact that the mechanical compressors are not compatible to the high temperatures involved and further are not as reliable as the jet compressor.

While in the most simple system, a single stage jet compressor shows the principles of operation of the jet compressor as applied to the completely closed MPD electrical power generation system, it is obvious that by the use of additional stages, the different stages of the compressor may be operated at different primary pressures to effect a stepped energy transfer process which has accumulative effect throughout the fluid passage of the compressor. A three stage jet compressor is shown in the single figure of the drawing.

In this respect, a low pressure liquid forming the primary fluid of the jet compressor, for example, cesium metal, is caused to flow through the low temperature side of the second heat exchanger 100 as a result of a mechanical pumping operation involving a conventional electromagnetic or mechanical pump 90. In a preferred form, all of the pumps handling the liquid condensate forming the jet compressor driving fluid are of the electromagnetic type, useful in pumping liquid metal and characterized by a lack of moving parts. The primary compressor liquid passes from pump 90 through line 92 to the second heat exchanger 100 and through the heat exchange coil 108 of this heat exchanger which is in heat transfer relation to the high temperature coil 104 carrying the working medium. The now heated primary and partially vaporized liquid is discharged from the second heat exchanger 100, passing by means of line 110, directly to the first stage heat exchange coil 54 of heat exchanger 50 where it is further vaporized and superheated. The vaporized, superheated primary fluid subsequently discharges from heat exchanger 50 and passes by line 112 to the primary discharge nozzle 62 of the jet compressor 60.

The high temperature, high pressure cesium vapor expands to a low temperature at high velocity as a result of passing through the discharge nozzle 62. The high velocity cesium vapor stream entrains the gaseous secondary stream (the working medium) within line 106 which is connected to the inlet of the jet compressor and delivers the secondary stream to a higher pressure required for circulating through the nuclear reactor 10 for a repetition of the cycle.

The representative system shown is of the three stage type in which a portion of the primary fluid which passes through heat exchanger 100 is diverted by means of line 116 to a second stage pump 118 preferably of the electromagnetic type. A portion of the primary fluid therefore passes as a result of line 120 through the first heat exchanger 50 within second stage heat exchange coil 56 to the second stage discharge nozzle 64 of the jet compressor, via conduit 122. The second stage cesium vapor stream emanating from nozzle 64 entrains the now accelerated gaseous secondary stream to further pressurize the stream prior to circulation of the secondary stream to reactor 10.

Likewise, a portion of the primary fluid emanating from the second stage pump 118 passes by means of line 124 to a third stage, electromagnetic pump 126 where it is further pressurized prior to delivery to the first heat exchanger 50 for passage through primary fluid heat exchanger coil 58 for vaporization and superheating. The high temperature, high pressure cesium vapor passes through line 130 from the heat exchanger 50 for discharge and expansion within the jet compressor as a result of delivery to the third stage discharge nozzle 66 within the compressor. Again, the further accelerated secondary stream (working fluid) is subjected to the expanding superheated cesium vapor whereby the desired high pressure of the working fluid is achieved prior to passage of the primary fluid and the entrained secondary fluid (working medium) reaches the diffuser section 68 of the jet compressor.

The entrained cesium vapor and the vaporized working medium is directed from the diffuser 68 to the condenser 70, whereupon, as a result of heat exchange between the relatively cool condensate coil 72 and the working fluid containing coil 74, a portion of the cesium vapor within the coil 74 which arrives through conduit 76 is thereby liquefied. The coolant emanates from a source not shown. A separator 80 which is connected to the heat exchanger coil 74 by line 82 and the primary fluid pump 90 by means of conduit 84 effects separation of the condensate by conventional means from the vaporized working medium. The pressurized working medium passes from the separator 80 by conduit 12 to the reactor to complete the cycle. Conversely, the condensate (liquid cesium) which is separated from the mixture emanating from the heat exchanger coil 74 is driven by pump means 90 back to the second heat exchanger 100 for vaporization and superheating.

The working medium may take the form of helium, argon, xenon or neon and may be seeded with cesium, sodium, potassium or rubidium.

It is obvious from the above description that the present invention is directed to the employment of a mechanical system of jet compressor staging to a closed MPD power generator for deriving the most kinetic energy from the sensible heat of the high temperature exhaust stream. While a single jet compressor may be used, or one having multiple stages, the invention is not limited to any particular type of jet compressor.

While there have been shown and described and pointed out the fundamental novel features of the invention as applied to a preferred embodiment, it will be understood that various omissions and substitutions and changes in the form and detail of the system illustrated and its operation may be made by those skilled in the art without departing from the spirit of the invention. It is the intention, therefore, to be limited only as indicated by the scope of the following claims.

What is claimed is:

1. In a completely closed magnetoplasmadynamic power generation system having a working fluid medium, means for heating said working medium to a high temperature, means to effect ionization thereof, and means for delivering said ionized high temperature, working medium at extreme velocity to a magnetoplasmadynamic electrical generator whereby a portion of the kinetic energy and thermal energy of the ionized working medium is converted to electrical form, the improvement comprising:
    a jet compressor including a secondary fluid inlet and a primary fluid discharge nozzle,
    means for directing the exhaust working medium from the generator to said compressor's secondary fluid inlet, and
    means for directing a vaporized, superheated driving fluid to said jet compressor fluid discharge nozzle whereby momentum transfer is achieved between said fluids and said working fluid is repressurized prior to being recirculated through said generator in continuous fashion.

2. The system as claimed in claim 1 further including a heat exchanger positioned between said generator and said jet compressor, and means for passing said working medium exhaust from said generator through said heat exchanger in heat transfer relation to said jet compressor primary fluid, whereby said primary fluid is vaporized and superheated as a result of heat exchange between said working medium and said primary fluid.

3. The system as claimed in claim 1 further including a heat exchanger positioned between said generator and said jet compressor including means for effecting heat transfer between the working medium exhausted from said generator and said separate jet compressor primary fluid, said system further including condenser and separator means positioned between said jet compressor and the means for heating, ionizing and accelerating said working medium prior to passage through said generator, and means for delivering liquid condensate from said condenser to said heat exchanger to form said vaporized, superheated primary driving fluid for said jet compressor.

4. The system as claimed in claim 1 wherein added working medium comprises: one gas from the group consisting of helium, argon, xenon and neon, seeded with low ionization potential atoms up to 3 mole percent of said jet compressor primary driving fluid comprises one condensate vapor of a group consisting of cesium, sodium, potassium and rubidium.

5. In a completely closed magnetoplasmadynamic power generation system having a working fluid medium, means for heating said working medium to a high temperature and ionizing the same and means for delivering ionized, high temperature working medium at high velocity to a magnetoplasmadynamic electrical generator, wherein a portion of the kinetic and thermal energy of the ionized working medium is converted to electrical energy, the improvement comprising:
    a jet compressor including a secondary fluid inlet and at least two separate fluid discharge nozzles in spaced axial flow position within said jet compressor,
    means for directing the working medium exhaust from said generator to said jet compressor secondary fluid inlet, and
    means for directing vaporized, superheated primary driving fluid to said jet compressor fluid discharge nozzles with said driving fluid passing through said discharge nozzle most remote from said secondary fluid inlet being at a higher pressure than said primary driving fluid passing through said other discharge nozzle, whereby said working medium is successively driven from said secondary fluid outlet by momentum transfer and repressurized prior to being recirculated to said generator in continuous closed system fashion.

6. The system as claimed in claim 5 wherein a heat exchanger is positioned between said generator and said jet compressor inlet, said heat exchanger including means for passing said working medium exhaust from said generator through said heat exchanger in heat exchange relation to said primary jet compressor driving fluid to achieve vaporization and superheating of said primary driving fluid prior to discharge of said primary driving fluid from said jet compressor fluid discharge nozzles.

7. The system as claimed in claim 5 further including condenser and separator means positioned between said jet compressor and said means for heating, ionizing and accelerating said working medium prior to passing said ionized medium through said generator whereby said primary driving fluid is condensed after passing through said jet compressor and is directed to said heat exchanger for revaporization and superheating.

8. In a completely closed magnetoplasmadynamic power generator system including a working fluid medium seeded with low ionization potential atoms up to 3 mole percent, nuclear energy means for heating said working medium to a high temperature to achieve at least partial ionization thereof, working medium acceleration means in the form of a nozzle positioned between said heating means and a magnetoplasmadynamic electrical generator whereby said working medium is delivered to said generator in an ionized state at a high temperature and high velocity to cause a portion of the kinetic and thermal energy to be converted to electrical form, the improvement comprising: a jet compressor including a secondary fluid inlet and multiple stage fluid discharge nozzles operating at varying pressures, means for delivering working medium exhausted from said generator to said jet compressor secondary fluid inlet, first and second heat exchangers positioned between said electrical generator and said jet compressor, means for directing the jet compressor primary driving fluid to said first and second heat exchangers in heat exchange relation to said working medium prior to delivery to said jet compressor secondary fluid inlet exhaust to cause said primary jet compressor driving fluid to become vaporized and superheated prior to delivery to said multiple stage discharge nozzles, said first heat exchanger including separate heat exchange means for each stage primary driving fluid, condenser and separator means positioned between said jet compressor and said heater for condensing said primary driving fluid emanating from said jet compressor outlet, primary liquid pumps associated with each stage heat exchange means within said first heat exchange for delivering liquid cesium condensate forming said primary driving fluid to said primary heat exchanger and said respective stage discharge nozzle within said jet compressor at different pressures, whereby said working medium is highly accelerated within the jet compressor as the result of primary fluid expansion, with the resulting momentum transfer creating the desired pressure rise of the working medium prior to said working medium being delivered to the heater in a continuous closed recirculation process.

References Cited

UNITED STATES PATENTS 3,133,212  5/1964  Szekely _____ 310—4

DAVID X. SLINEY, *Primary Examiner.*